US006929430B2

(12) United States Patent
Dever

(10) Patent No.: US 6,929,430 B2
(45) Date of Patent: Aug. 16, 2005

(54) PIPE FITTING REMOVAL TOOL

(76) Inventor: Christopher Joe Dever, 222 E. 3060 North, Provo, UT (US) 84604

( * ) Notice: Subject to any disclaimer, the term of this patent is extended or adjusted under 35 U.S.C. 154(b) by 179 days.

(21) Appl. No.: 10/153,407

(22) Filed: May 21, 2002

(65) Prior Publication Data
US 2002/0150433 A1 Oct. 17, 2002

Related U.S. Application Data

(63) Continuation-in-part of application No. 09/699,265, filed on Oct. 28, 2000, now abandoned.

(51) Int. Cl.$^7$ .............................................. B23B 51/04
(52) U.S. Cl. ........................ 408/80; 408/1 R; 408/201; 408/204
(58) Field of Search ............................. 408/79, 80, 81, 408/82, 201, 204, 209, 1 R

(56) References Cited

U.S. PATENT DOCUMENTS

| | | | | |
|---|---|---|---|---|
| 2,388,779 A | * | 11/1945 | Boehmler | 470/18 |
| 2,725,766 A | * | 12/1955 | Heukelom | 408/81 |
| 2,868,085 A | * | 1/1959 | Klein | 408/80 |
| 3,266,345 A | * | 8/1966 | Weisner et al. | 408/201 |
| 4,571,129 A | * | 2/1986 | Strand | 408/54 |
| 4,580,934 A | * | 4/1986 | McCormick | 408/201 |
| 4,693,643 A | * | 9/1987 | Heyworth | 408/82 |
| 4,720,219 A | * | 1/1988 | Masonek et al. | 408/201 |
| 4,749,315 A | * | 6/1988 | Mills | 408/209 |
| 4,968,189 A | * | 11/1990 | Pidgeon | 408/1 R |
| 5,013,193 A | * | 5/1991 | Rabo et al. | 408/201 |
| 5,304,018 A | | 4/1994 | LaVanchy et al. | |
| 5,314,270 A | * | 5/1994 | Lavancy et al. | 408/1 R |
| 5,366,326 A | * | 11/1994 | Converse | 408/72 B |
| 5,413,437 A | * | 5/1995 | Bristow | 408/1 R |
| 5,624,213 A | * | 4/1997 | Anderson | 408/206 |
| 5,704,739 A | * | 1/1998 | Bridenstine et al. | 408/1 R |
| 5,741,097 A | * | 4/1998 | Murphy, II | 409/180 |
| 5,743,682 A | * | 4/1998 | Chaney, Sr. | 408/79 |
| 5,820,315 A | * | 10/1998 | Collard | 408/80 |
| 6,048,141 A | * | 4/2000 | Freeman | 408/201 |
| 6,305,885 B1 | * | 10/2001 | Linthicum | 408/1 R |
| 6,676,343 B2 | * | 1/2004 | Burk | 408/204 |

FOREIGN PATENT DOCUMENTS

JP          10-71517      *  3/1998

* cited by examiner

Primary Examiner—Daniel W. Howell
(74) Attorney, Agent, or Firm—Angus C. Fox, III

(57) ABSTRACT

A method and tool are disclosed for removing a plastic water closet flange from the waste pipe to which it is attached so that a new flange may be chemically bonded to the existing waste pipe. A preferred embodiment of the water closet flange removal tool includes an axial shaft, a cylindrical guide body attached to a lower end of the shaft, the guide body having an outer diameter slightly less than the inner diameter of the waste pipe so that it is slidably insertable therein, and a cylindrical-walled cutter, having an inside diameter slightly greater than the outer diameter of the waste pipe, mounted above the guide body. For a preferred embodiment of the tool, both the guide body and the cylindrical-walled cutter are coaxially mounted on the shaft. The cylindrical-walled cutter is open at the lower end thereof so that it can slide over the waste pipe as the flange is cut therefrom. In order to use the tool, an upper end of the shaft is coupled to a drill motor, the guide body is inserted through the central opening of the flange and into the waste pipe. The shaft is then rotated with the drill motor. With the cutter rotating, the tool is driven further into the waste pipe until the flange is cut therefrom. The tool is then retracted and the flange discarded.

12 Claims, 5 Drawing Sheets

PIPE FITTING REMOVAL TOOL

This is a continuation-in-part of application Ser. No. 09/699,265, which was filed on Oct. 28, 2000, and is now abandoned.

BACKGROUND OF THE INVENTION

1. Field of the Invention

This invention relates to plumbing tools and, more particularly to methods and apparatus for removing a plastic plumbing component that is chemically bonded to a mating component.

2. Description of Related Art

Until the late 1960s, cast iron pipe was used almost exclusively to convey sewer waste from residences and businesses to the main sewer line. Joints were packed with caulking rope and molten lead was poured into the joint to hold the caulking in place. However, after 1970, acrylonitrile-butadiene-styrene (ABS) plastic pipe rapidly replaced cast iron due to much lower material costs and greatly reduced installation costs. A water closet flange, a termination of the toilet waste pipe to which a toilet mounts, which originally had been a solid cast iron piece—replaceable by melting the lead and removing the caulking rope which secured it to the waste pipe—to a much less sturdy part. The new, less-substantial part are either made entirely from ABS plastic, or made partly from ABS plastic and attached to a rotatable sheet metal flange stamped from painted, non-stainless steel. Neither the all-ABS part nor the composite part are designed to last much more than twenty years. A steel flange will eventually rust and break. An ABS flange will deform under pressure and eventually break. Consequently, water closet flanges which were installed in the 1970s are now requiring replacement. Heretofore, replacement of an ABS flange has generally required a splice joint in the waste pipe. If the waste pipe is accessible from below (i.e., via a crawl space or by cutting open a ceiling, the job is manageable. However, if the pipe is embedded in concrete, replacement can be a major job requiring removal and replacement of concrete around the flange and around the waste pipe to which it is connected.

U.S. Pat. No. 5,304,018 to LaVanchy, et al. discloses a plunge cutter for plastic pipe, pipe couplings, and plastic flanges. The plunge cutter has a cylindrical body supporting cutters, a drive shaft, a pilot mandrel for guiding the cylindrical body. The cutters are adjustably mounted in cutter slots formed in the cylindrical body so that the cutters present forwardly facing cutting edges which lie skewed relative to a radius of the cylindrical body. A method for the use of the plunge cutter is also provided.

There are two problems with the design of the LaVanchy, et al. tool. The first is a relatively high cost of manufacture. The body of the cutter must be either cast or machined. The cutters, which must be manufactured separately from the body, must be secured in grooves within the body. The method of construction is relatively labor intensive, relatively complex, and requires a relatively high degree of precision for proper functionality. The second problem with the LaVanchy, et al. tool is that the mounting of the separate cutter blades within the front-facing tubular portion of the body mandates that the thickness of the tubular portion be greater than the thickness of most closet hicker than must be of a thickness that is greater than the thickness of most closet flange couplers. Thus, when a closet flange is embedded within a concrete slab, as is the case with most homes in the Southwestern, Southcentral and Southeastern states, the closet flange cannot be removed without the body of the tool striking the concrete.

For applications where a closet flange is embedded within a concrete slab, it would be desirable if the thickness of the cutting elements of a plunge cutter were thinner than the walls of the closet flange coupler collar.

What is needed is a new plunge cutter which is inexpensive to manufacture, and which may be used to successfully cut away closet flanges, even when they are embedded within a concrete slab. Although the device may be used to remove any type of pipe coupling on a straight section of pipe, the invention would be particularly useful for removing water closet flanges which have become unusable due to rust or breakage. Ideally, a new fitting, coupling or flange could be installed on the pipe, with little or no cleanup, simply by apply a new layer of adhesive and installing the fitting, coupling or flange.

SUMMARY OF THE INVENTION

The present invention provides both a method and an apparatus for removing a polymeric plastic plumbing fitting, such as a coupling or water closet flange from the pipe to which it is attached so that a new fitting or flange may be chemically bonded to the pipe. A preferred embodiment of the water closet flange removal tool includes an axial shaft, a cylindrical guide body attached to a lower end of the shaft, the guide body having an outer diameter slightly less than the inner diameter of the waste pipe so that it is slidably insertable therein, and a cylindrical-walled cutter, having an inside diameter slightly greater than the outer diameter of the waste pipe, mounted above the guide body. For a preferred embodiment of the tool, both the guide body and the cylindrical-walled cutter are coaxially mounted on the shaft. The cylindrical-walled cutter is open at the lower end thereof so that it can slide over the pipe as the flange is cut therefrom. In order to use the tool in the case were a water closet flange is removed from a waste pipe to which it has been chemically bonded, an upper end of the shaft is coupled to a drill motor, the guide body is inserted through the central opening of the flange and into the waste pipe. The shaft is then rotated with the drill motor. With the cutter rotating, the tool is driven further into the waste pipe until the flange is cut therefrom. The tool is then retracted and the flange discarded. For removing a closet flange that is embedded within concrete, the ideal thickness of the cylindrical-walled cutter is no greater than the thickness of the connector collar which attaches the flange to the waste pipe. For removing flanges and coupling which are not embedded within concrete, the thickness of the cylindrical-walled cutter may be greater than the thickness of the connector collar, thereby eliminating the need to completely cut through the collar in order to remove the flange. With very little touch up, the waste pipe can be prepared to receive the connector collar of a new water closet flange, which can be easily chemically bonded to the waste pipe. The invention eliminates the need for the splicing of pipes and structure damage that might be required to effect the splicing operation.

PREFERRED EMBODIMENT OF THE INVENTION

The present invention, which provides both a method and a tool for removing a pipe fitting made of polymeric plastic material from a pipe to which it has been chemically bonded. The pipe fitting removal tool and the process of removing a pipe fitting will now be disclosed in the context of removing a water closet flange from the waste pipe to which it is attached, with reference being made to the attached drawing figures.

Figure 1:
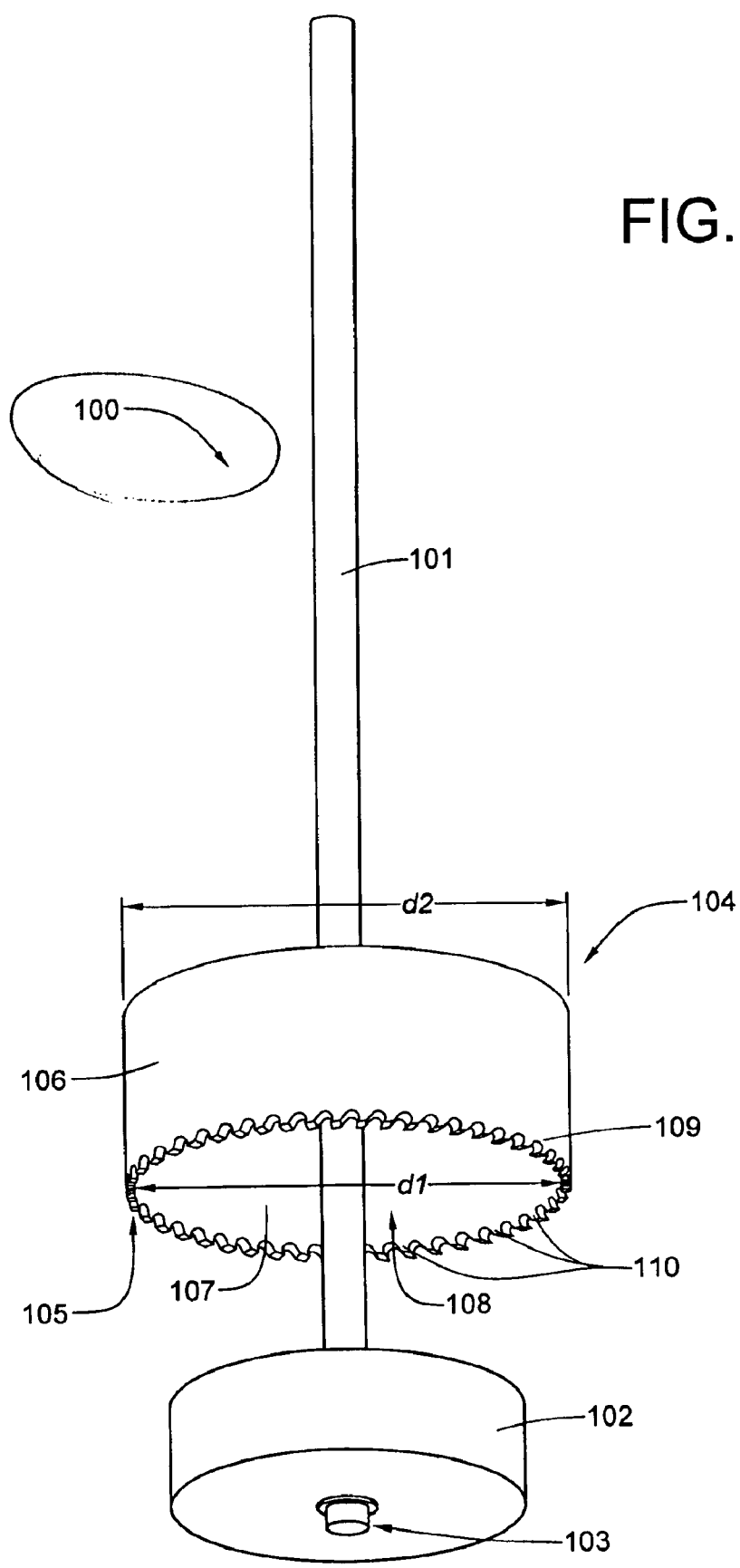
FIG. 1 is an isometric view of a basic embodiment of the pipe fitting removal tool.
Figure 2:
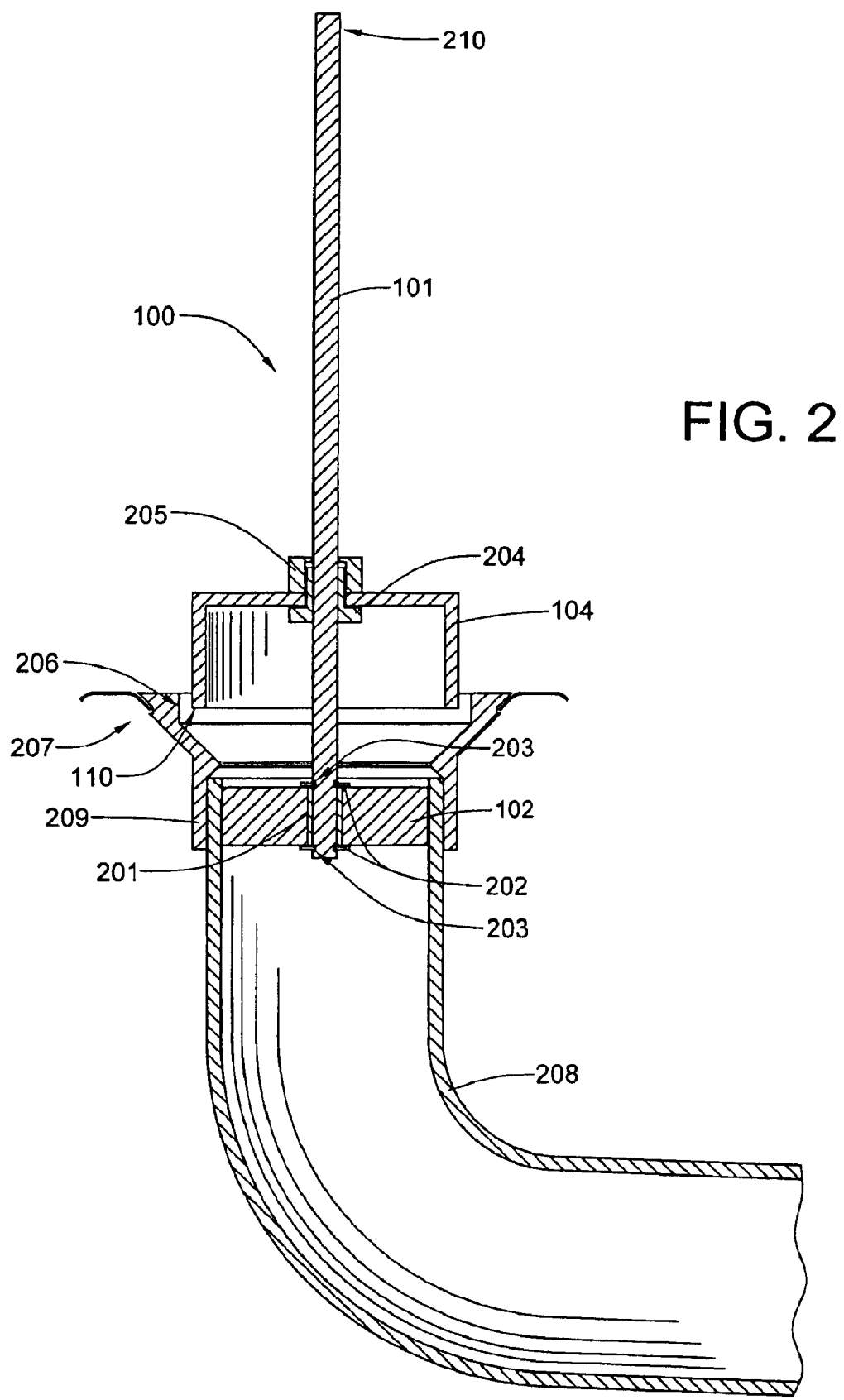
FIG. 2 is a cross sectional view of a waste pipe, an attached water closet flange, and a flange removal tool that has been installed in the waste pipe prior to beginning the process of removing the flange.

Referring now to both FIG. 1 and FIG. 2, a preferred embodiment of the tool 100 for removing a pipe fitting, such as a water closet flange, includes an axial shaft 101, a cylindrical guide body 102 attached to a lower end 103 of the shaft 101, the guide body having an outer diameter slightly less than the inner diameter of a water closet waste pipe so that it is slidably insertable therein, and a rotary cutter 104, having an inside diameter slightly greater than the outer diameter of the waste pipe, mounted above the guide body 102. The rotary cutter 104 has a cylindrical wall 105 with exterior and interior cylindrical surfaces, 106 and 107 respectively, the interior cylindrical surface 107 forming a hollow cylindrical chamber 108 having a diameter d1 about equal to the outside diameter of the pipe, the chamber 108 being open at an end which faces the guide body 102, the hollow chamber 108 being axially penetrated by the shaft 101, and the cylindrical wall 105 having a downward facing rim 109 into which are cut a plurality of cutting teeth 110. For removing a closet flange that is embedded within concrete, the ideal thickness of the cylindrical-walled cutter is no greater than the thickness of the connector collar which attaches the flange to the waste pipe. Thus for such a case, diameter d2 should be greater than d1, but no greater than the exterior diameter of the connector collar. For if it were larger, the concrete would destroy the tool and it would be impossible to run the tool into the pipe. However, for removing flanges and coupling which are not embedded within concrete, the thickness of the cylindrical-walled cutter may be greater than the thickness of the connector collar, thereby eliminating the need to completely cut through the collar in order to remove the flange. For such a case d2 may be equal to or greater than the diameter of the connector collar. For a preferred embodiment of the tool 100, both the guide body 102 and the cylindrical-walled cutter 104 are coaxially mounted on the shaft 101. The chamber 108 is open at the lower end thereof so that it can slide over the waste pipe as the flange is cut therefrom. The teeth 110 are designed to cut a circular groove in a downward direction as the cutter 104 spins with the shaft 101. Also for the preferred embodiment of the invention.

Now, with particular attention given to FIG. 2, for a preferred embodiment of the tool 100, the guide body 102 is rotatably mounted on the shaft 101, and an oil-impregnated, sintered bronze bushing 201 is pressed into the guide body 102, which may be made of a metal, such as steel or aluminum, or of a polymeric plastic material or fiber-reinforced plastic material. The guide body 102 is retained on the shaft 101 by upper and lower snap rings 202. The snap rings fit into circumferential grooves 203 machined in the shaft 101. Alternatively, the guide body 102 may be rigidly affixed to the shaft 101. In order to prevent friction-generated heat from melting or scoring the plastic on the interior surface of the waste pipe, the interior of the waste pipe may be smeared with a lubricant during the flange or fitting removal process. The cutter 104 is rigidly and non-rotatably, though removably, attached to a mandrel 204, which is, in turn, rigidly affixed to the shaft 101. In order to replace the cutter 104, a hold down nut 205 is loosened and removed in order to slide the cutter 104 from the mandrel 204. Replacement of the cutter 103 is the reverse of the foregoing process. The shaft 101 and mandrel 104 may be fabricated from any durable metal, such as steel, or even aluminum. If manufactured from aluminum, it should be heat treated to make it resistant to bending.

Operation of the tool 100 will now be described with reference to FIGS. 2 through 5 in connection with the removal of a water closet flange from the waste pipe to which it is attached. An upper end 210 of the shaft 101 is coupled to a drill motor (not shown), the guide body is inserted through the central opening 206 of the water closet flange 207 and into the waste pipe 208. The shaft 101 is then rotated with the drill motor. With the cutter 104 rotating with the shaft 101, the tool 100 is driven further into the waste pipe 208 until the flange connector collar 209 is cut therefrom so that the flange 207 is freed from the waste pipe 208. FIG. 2 shows a flange removal tool 100 installed in the waste pipe 208 prior to beginning the process of cutting away the collar 209 and removing the flange 207.

Figure 3:
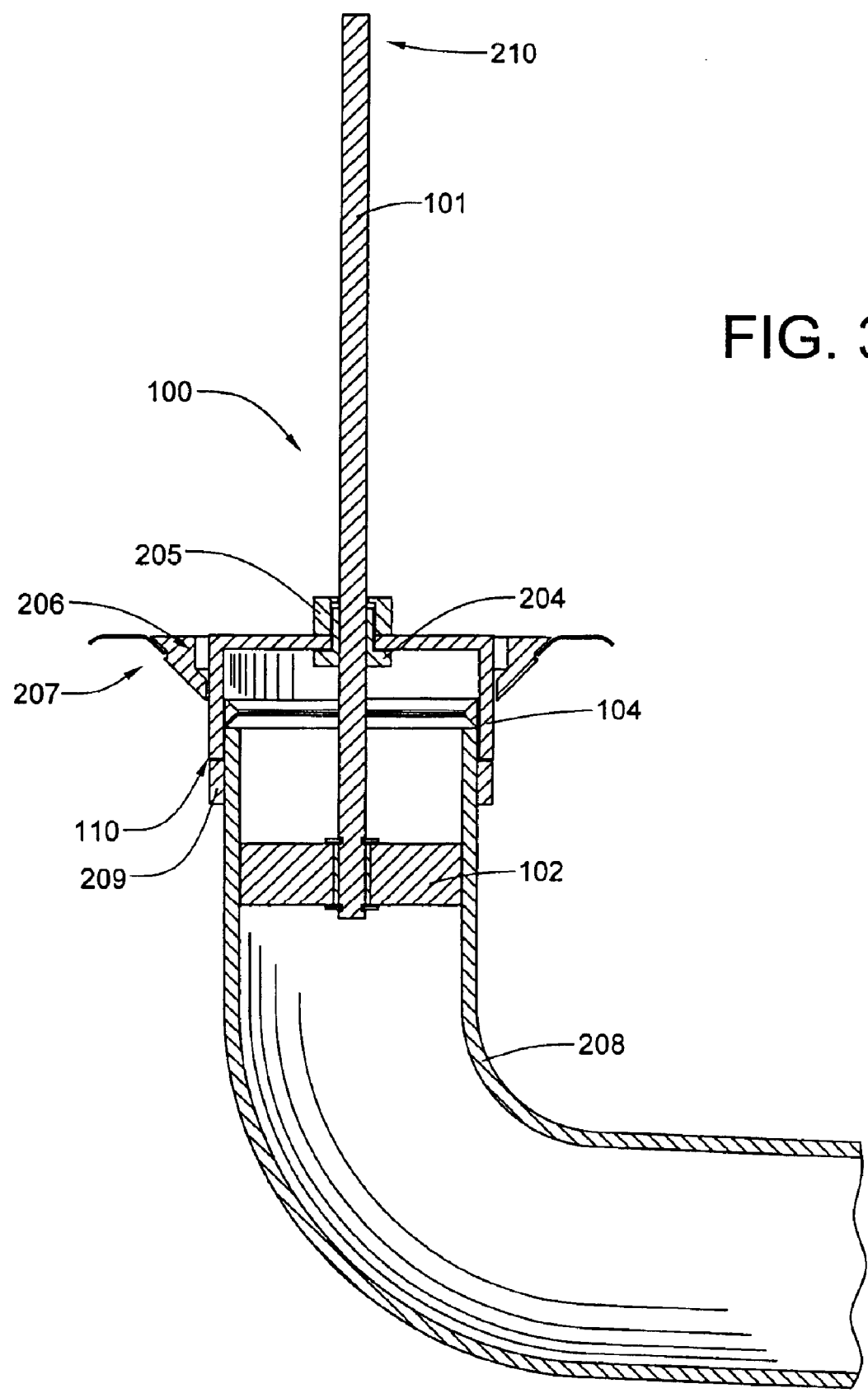
FIG. 3 is a cross sectional view of the waste pipe, attached water closet flange and flange removal tool of FIG. 2, subsequent to a cutting operation that has removed about half the connection collar of the water closet flange.

Referring now to FIG. 3, the tool 100, flange 207, and waste pipe 208 are shown after the flange connector collar 209 has been about half cut away by the rotating cylindrical-walled cutter 103. As the collar 209 is cut away, the guide body 102 advances further into the waste pipe 208.

Figure 4:
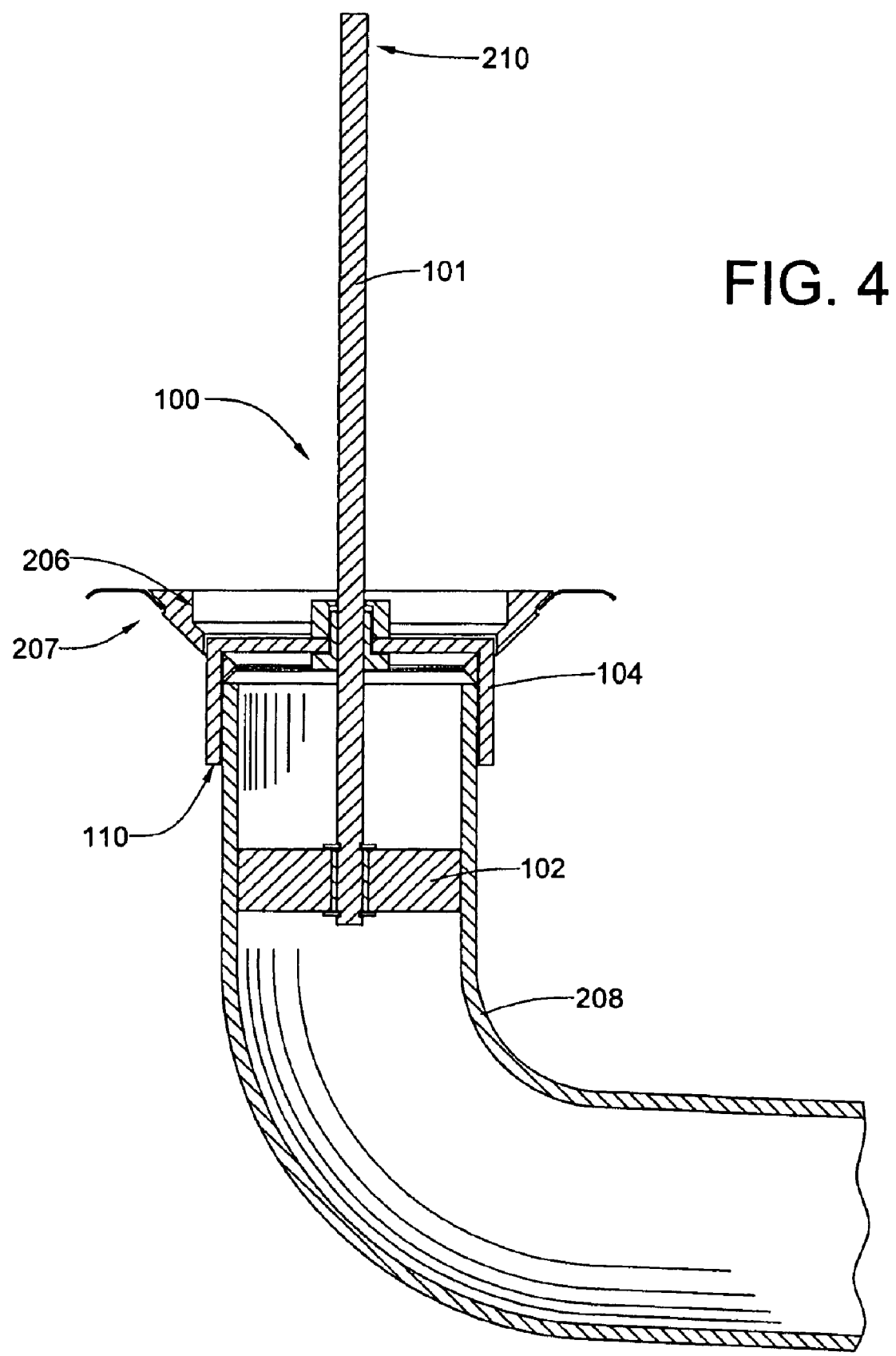
FIG. 4 is a cross sectional view of the waste pipe, attached water closet flange, and flange removal tool of FIG. 3, subsequent to a further cutting operation that has removed the entire connection collar of the water closet flange.

Referring now to FIG. 4, the collar 209 has been completely cut away during a further cutting operation, freeing the flange 207 from the waste pipe 208.

Figure 5:
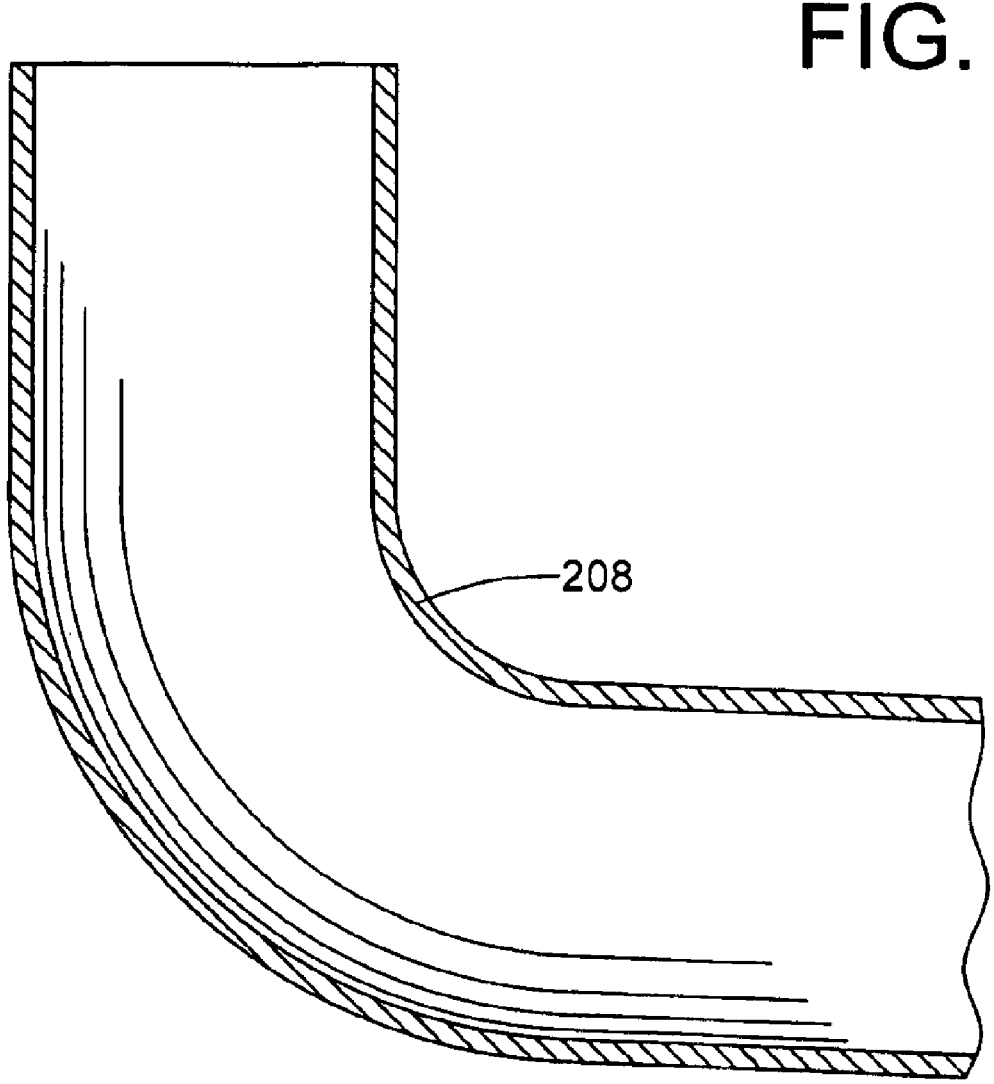
FIG. 5 is a cross section view of the waste pipe of FIG. 4 following removal of the tool and the severed flange.

In FIG. 5, the tool 100 has been removed from the waste pipe 208, and pieces of the severed flange 207 are discarded. With very little touch up, the waste pipe 104 can be prepared to receive the connector collar of a new water closet flange, which can be easily chemically bonded to the waste pipe 208. The invention eliminates the need for the splicing of pipes and structure damage that might be required to effect the splicing operation.

It should be readily apparent that the tool and the removal process will work with polymeric plastic pipe of any diameter, as long as the guide body 102 and the cutter 104 are properly sized for the application. It should also be readily apparent that the tool and removal process will work on nearly any size pipe made of virtually any type of polymeric plastic material. Use of the tool with pipes and fittings of up to 12-inch diameter, which have been fabricated from both polyvinyl chloride and ABS are currently contemplated. It should also be readily apparent that the tool may be used to remove closet flanges, or any other pipe fitting which is chemically bonded to a straight section of pipe.

Although only a single embodiment of the water closet flange removal tool has been disclosed herein, it will be obvious to those having ordinary skill in the art that changes and modifications may be made thereto without departing from the scope and the spirit of the invention as hereinafter claimed.

What is claimed is:

1. A tool for removing a fitting from a pipe without cutting said pipe, said pipe having an outside diameter, and said fitting having been chemically bonded to an outer surface of said pipe, said tool comprising:

a cylindrical shaft;

a cylindrical guide body rotatably mounted coaxially at a lower end of said shaft, said cylindrical guide body having pressed therein an oil-impregnated sintered bronze bushing which provides bearing contact against the shaft, said guide body sized for a snug, yet non-interference fit within said pipe; and a rotary cutter mounted rigidly and coaxially on said shaft above said guide body, said cutter having a cylindrical wall with exterior and interior cylindrical surfaces, said exterior cylindrical surface having a first diameter less than or equal to an exterior diameter of a coupler portion of the fitting, said interior cylindrical surface forming a hollow cylindrical chamber having a second diameter about equal to the outside diameter of said pipe, said chamber being open at an end which faces the guide body, and axially penetrated by said shaft, said cylindrical wall having a downward facing rim into which are cut a plurality of cutting teeth.

2. A method for removing a pipe fitting from a pipe to which it has been chemically bonded, without cutting out at least a portion of the pipe, said method comprising the steps of:

providing a tool having a cylindrical shaft, a cylindrical guide body mounted rigidly and coaxially on said shaft, said guide body sized for a snug, yet non-interference fit within said waste pipe, and a cylindrical-walled cutter mounted rigidly and coaxially on said shaft above said guide body, said cutter having a downward facing rim into which are cut a plurality of cutting teeth and a cylindrical lower opening sized to fit over the exterior of said pipe;

smearing a lubricant on the inner surfaces of said pipe;

inserting the guide body through the fitting to be removed and into the interior of said pipe;

simultaneously rotating said tool about the axis of said shaft and advancing said tool further into the interior of said pipe until said fitting is cut away from an outer surface of said pipe;

removing said tool from within said pipe; and removing debris remaining from said cut-away pipe fitting.

3. The method of claim 2, wherein the step of providing said tool further comprises the step of selecting a cylindrical-walled cutter having an inside diameter about equal to the outer diameter of said pipe, and an outer diameter at least equal to an outer diameter of the pipe fitting in a region where it is bonded to said pipe.

4. The tool of claim 1, wherein said guide body is retained on said shaft with a pair of snap rings, each of which fits into a circumferential groove in said shaft.

5. The tool of claim 1, wherein said guide body is rigidly mounted to said shaft.

6. The tool of claim 1, wherein said cylindrical-walled cutter has an inside diameter about equal to the outer diameter of said pipe.

7. The tool of claim 6, wherein said cylindrical-walled cutter has an outer diameter at least equal to an outer diameter of a portion of the fitting which is bonded to the pipe.

8. A tool for removing a water closet flange from a waste pipe having an outer diameter, said water closet flange having a coupler portion that has been chemically bonded to an outer surface of said waste pipe, removal of said water closet flange being accomplished without destroying or cutting a portion of said waste pipe, said tool comprising:

a cylindrical shaft;

a cylindrical guide body rotatably and coaxially mounted on said shaft, said guide body having pressed therein an oil-impregnated sintered bronze bushing which provides bearing contact against the shaft, said guide body sized for a snug, yet non-interference fit within said waste pipe; and a rotary cutter mounted rigidly and coaxially on said shaft above said guide body, said cutter having a cylindrical wall with exterior and interior cylindrical surfaces, said exterior cylindrical surface having a first diameter less than or equal to an exterior diameter of the coupler portion, said interior cylindrical surface forming a hollow cylindrical chamber having a second diameter about equal to the outside diameter of said waste pipe, said chamber being open at an end which faces the guide body, and axially penetrated by said shaft, said cylindrical wall having a downward facing rim into which are cut a plurality of cutting teeth.

9. The method of claim 2, wherein the step of axially rotating said tool is performed using a drill motor coupled to an upper end of said shaft.

10. The tool of claim 8, wherein said guide body is retained on said shaft with a pair of snap rings, each of which fits into a circumferential groove in said shaft.

11. The tool of claim 8, wherein said cylindrical-walled cutter has an inside diameter about equal to the outer diameter of said waste pipe.

12. The tool of claim 11, wherein said cylindrical-walled cutter has an outer diameter at least equal to an outer diameter of said coupler portion.

* * * * *